United States Patent Office.

WESTON W. KILBOURN, OF SANFORD, NEW YORK.

Letters Patent No. 107,693, dated September 27, 1870.

IMPROVEMENT IN CHEWING-GUM.

The Schedule referred to in these Letters Patent and making part of the same

I, WESTON W. KILBOURN, of Sanford, in the county of Broome and State of New York, have invented a certain Compound called Tobacco Antidote or Chewing-Gum, to be used as a substitute by those habituated to the use of tobacco.

My invention relates to certain ingredients composing a gum, which is designed as a pleasant and healthful substitute for tobacco, the same to be employed as a medicine or antidote to cure persons addicted to the use of tobacco of the desire to indulge the habit, more especially that of chewing it, wherefore I call it tobacco antidote or chewing-gum.

Said ingredients have such properties as are agreeable to the taste, healthful to the gums and teeth, and productive of good breath, the said ingredients or component parts being made into a gum, which, when employed as a substitute for tobacco, not only alleviates the desire to chew or smoke tobacco of any quality, but also affords permanent relief to those who have contracted the habits its use engenders.

It is composed of twelve parts of gum dammar, two parts of cera alba, two parts of sweet or peanut oil, and one part of balsam tolu, which are mixed and heated to boiling point, and then poured into cold water, and worked until it is white. It is then softened with warm water, and rolled through a machine made for the purpose, by which it is formed into sticks.

Claim.

A tobacco antidote or chewing-gum, composed substantially as above described, and for the purpose set forth.

Witnesses:     WESTON W. KILBOURN.
  FRANK STURDEVANT, M. D.,
  ELI MOORE.